Patented June 1, 1937

2,082,715

UNITED STATES PATENT OFFICE 2,082,715

PROCESS OF MAKING THIN-WALLED HOLLOW BODIES FROM PLASTICS

Albert Nadai, Zurich, Switzerland

No Drawing. Application September 23, 1935, Serial No. 41,779. In Switzerland September 26, 1934

4 Claims. (Cl. 18—56)

This invention relates to the manufacture of thin walled hollow bodies from plastic masses such as cellulose esters, artificial resins and the like.

Processes for the manufacture of hollow bodies from these substances are already known.

The object of the present invention is a process which in a simple and reliable way permits of the manufacture of hollow bodies of any shape and cross-section, e. g. narrow necked bottles, rectangular containers, spheres and the like. The process consists in preforming a hollow body, inserting the same in a suitably contoured mould, heating the mould and the hollow body, and softening the latter by immersion in a heated liquid which contains a solvent or plasticizer for the cellulose ester or other plastic, and expanding the said hollow body and shaping it to the mould by blowing with air or other gas under pressure.

There are formed hollow bodies corresponding to the shape of the moulds, which solidify on cooling and may be removed without trouble from the mould.

For the starting material which is worked up according to the new process it is very important that the temperature should not exceed a certain upper limit, otherwise there is danger of burning. For the same reason it is impossible to carry out the warming of the starting material by the metal mould alone since in this case the temperature of the mould must be so high that, on the following blowing out, the hollow body, consisting for example of cellulose esters, burns on the wall of the mould or bakes on to it. The use of steam for softening and blowing as is used for example in the cellulose industry is not preferred when the hollow bodies are to remain transparent for the use of steam produces a clouding.

The new process can e. g. be so carried out that the pre-formed bowl shaped hollow bodies are first brought to the softness necessary for blowing by placing them along with the metal mould in a hot liquid bath which by its composition and temperature brings about a softening of the hollow body, whereby by accurate maintenance of definite conditions, overheating or other injury of the material of the hollow body is avoided. A bath of high boiling oil, e. g. paraffin oil, machine oil etc. if desired in combination with chemically active additions e. g. acetone, methanol, triacetin, butyl glycol etc. is used. With suitable compositions of these baths e. g. paraffin oil with triacetin or machine oil with butyl glycol a relatively low temperature of 100°–130° C. suffices in order to make the cellulose ester hollow bodies almost immediately so soft and plastic that a very great expansion of the material becomes possible whereas without chemically active additions to the oil bath, a much higher temperature e. g. 180°–190° C. would be necessary. It is clear that higher temperatures also bring the danger of burning of the cellulose material. After this temperature is attained the hollow body is blown out in the mould by air under moderate pressure e. g. 0.1–0.3 atmosphere. Since many cellulose esters become cloudy and nontransparent owing to the production of microscopically fine cracks on the inner side of the body with excessive stretching at the strongly expanded parts, some solvent vapours or mixtures of these, for example acetone alcohol or methanol are preferably added to the pressure air. These on over-stretching of the layer maintain the latter transparent and elastic.

The gas employed for blowing can be preheated.

The process can also be carried out in such a manner that the acquirement of shape is carried through in stages. The cylindrical hollow body is first softened in the warm condition with hot air and formed into admissible shapes with warm moulds whereupon the so far preformed body once again is made plastic by the above described treatment, introduced into the final mould which is also warmed and pressed while hot.

I declare that what I claim is:—

1. A process of making thin walled hollow bodies, having an opening therein, from cellulose esters or other plastics which consists in preforming the hollow body, inserting the same in a mould, heating the mould and softening the hollow body simultaneously by immersion in a heated liquid of high boiling point oils containing plasticizers of high boiling point for the cellulose ester or other plastic and expanding the hollow body and shaping it to the mould by blowing with air or other gas under pressure.

2. Process as claimed in claim 1 in which a gaseous or liquid clarifying agent or mixture of agents is added to the pressure air.

3. Process as claim in claim 1 in which to prevent excessive expansion, shape is acquired in several stages in a plurality of moulds.

4. Process as claimed in claim 1 in which the air or gas is pre-heated.

ALBERT NADAI.